(12) United States Patent
Shiraishi et al.

(10) Patent No.: US 7,213,414 B2
(45) Date of Patent: May 8, 2007

(54) PROCESS FOR PRODUCING FLAT GLASS

(75) Inventors: Yoshihiro Shiraishi, Kanagawa (JP); Motoichi Iga, Kanagawa (JP); Toru Kamihori, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 146 days.

(21) Appl. No.: 11/016,899

(22) Filed: Dec. 21, 2004

(65) Prior Publication Data
US 2005/0103054 A1 May 19, 2005

Related U.S. Application Data

(63) Continuation of application No. PCT/JP03/07774, filed on Jun. 19, 2003.

(30) Foreign Application Priority Data
Jun. 24, 2002 (JP) ............... 2002-182606

(51) Int. Cl.
C03B 17/06 (2006.01)
(52) U.S. Cl. .............. 65/25.3; 65/90; 65/92; 65/99.1; 65/100; 65/184
(58) Field of Classification Search ........ 65/25.1, 65/25.2, 25.3, 90–94, 99.1, 99.2, 99.3, 100, 65/184–186, 245, 253, 254, 257, 258, 370.1, 65/198
See application file for complete search history.

(56) References Cited

U.S. PATENT DOCUMENTS 1,586,187 A * 5/1926 Ferngren ................ 65/100
1,816,179 A * 7/1931 Drake ..................... 65/85
2,097,315 A * 10/1937 Watkins ................ 65/374.1
2,878,621 A * 3/1959 Zellers, Jr. et al. ..... 65/182.2
3,275,429 A * 9/1966 Javaux .................. 65/185
3,447,788 A * 6/1969 Bornor ..................... 432/2
6,101,845 A * 8/2000 Kojima et al. ........... 65/101
6,311,523 B1 11/2001 Kojima et al.

FOREIGN PATENT DOCUMENTS

| EP | 0 884 283 | 12/1998 |
|---|---|---|
| JP | 2001-180950 | 7/2001 |
| JP | 2001-180951 | 7/2001 |
| JP | 2001-192218 | 7/2001 |
| JP | 2001-192219 | 7/2001 |
| JP | 2001-192221 | 7/2001 |
| JP | 2002-193630 | 7/2002 |

* cited by examiner

Primary Examiner—Eric Hug
(74) Attorney, Agent, or Firm—Oblon, Spivak, McClelland, Maier & Neustadt, P.C.

(57) ABSTRACT

The present invention relates to improvement in a method of supplying a glass ribbon in a molten state to be supplied from a glass melting furnace to a flat glass forming apparatus, which can further improve the smoothness of a flat glass after formed. A glass ribbon 13 supplied from a glass melting furnace 14 to a flat glass forming apparatus 15 is stretched between one pair of tension rollers 24A and 24B in an S-shape and the tension rollers 24A and 24B are rotated while applying a surface pressure to the glass ribbon 13 face via a thin layer of a steam film generated by vaporization of a steam film forming agent. By means of rotation of the tension rollers 24A and 24B, the face of the glass ribbon 13 still in a molten state is polished via the steam film 18.

10 Claims, 3 Drawing Sheets

PROCESS FOR PRODUCING FLAT GLASS

CROSS REFERENCE TO RELATED APPLICATION

This is a Continuation Application of PCT Application No. PCT/JP03/07774, filed on Jun. 19, 2003, which was not published under PCT Article 21(2) in English. This application is based upon and claims the benefit of priority from the prior Japanese Patent Application No. 2002-182606, filed Jun. 24, 2002, the entire contents of which are incorporated herein by reference.

TECHNICAL FIELD

The present invention relates to a process for producing a flat glass, particularly, it relates to improvement in the smoothness of the glass surface of a formed flat glass.

BACKGROUND ART

As a process for producing a flat glass, a tin float process employing molten tin, a pull method, a down draw process, a fusion process and the like have been known.

However, in the above tin float process, since a glass ribbon is floated on a medium having a higher thermal conductivity than glass (on a float bath of molten tin) for forming, the transfer of heat to the medium is significant, and the influence of the temperature of the medium is significant, and accordingly the temperature control of the medium is very important. Further, gradual cooling is required under strict control by making the temperature of the medium close to the temperature of the glass so that the difference in the temperature between the surface and the inside of the glass ribbon during cooling is small. Accordingly, the cooling has to be carried out slowly, an adequately long float bath is required, and accordingly the forming time tends to be long. Further, in view of quality also, various drawbacks derived from tin are likely to occur. Further, exhaustion of tin resource is concerned.

On the other hand, in the pull method, the down draw process and the fusion process, due to forming in a vertical direction, it tends to be difficult to control the force resulting from the gravity to the glass ribbon, whereby it tends to be difficult to control the thickness of the glass, and the temperature control of the medium to decrease the difficulty becomes complicated.

Under these circumstances, the present applicant has proposed a technique relating to a process for forming a flat glass by forming a glass ribbon in a molten state into a plate shape via a thin layer of a steam film by using a base containing a steam film forming agent (hereinafter referred to as "steam float process") (JP-A-9-295819). According to this process for producing a flat glass, such effects as resource saving, energy saving, high quality of the flat glass, decrease in equipment and operation cost, easiness of job change and possibility of variety of applications to small scale production to large scale production, can be obtained.

However, in order to further improve the smoothness of the glass surface of the formed flat glass, in addition to improvement in the forming process in a flat glass forming apparatus, improvement in the supply method capable of improving the smoothness of the glass ribbon in a molten state supplied from a glass melting furnace to a flat glass forming apparatus is required.

That is, the molten glass molten in a glass melting furnace flows as a ribbon shape glass ribbon on a lip face made of bricks at the exit of the glass melting furnace and runs down from the edge of the lip face, and lands on a flat glass forming apparatus. The surface characteristics (particularly roughness) of the lip face are likely to be transcribed to the lip face side of the glass ribbon when it flows on the lip face, and the trace of transcription may have bad influences over the smoothness of the flat glass after formed in the flat glass forming apparatus.

Further, since the viscosity of the glass ribbon which flows on the lip face is not completely the same but slightly changes, the glass ribbon is likely to run down straight down from the edge of the lip face when the viscosity is low, and the glass ribbon is likely to run down while describing a parabola from the edge of the lip face when the viscosity is high. Accordingly, the angle at which the glass ribbon runs down from the edge of the lip face is not stable, thus the glass ribbon pulsates at the edge of the lip face, and the trace of the pulsation may have bad influences over the smoothness of the flat glass. Further, because of unstable angle at which the glass ribbon runs down from the edge of the lip face, not only the landing point of the glass ribbon which lands on the flat glass forming apparatus will not be constant but also the landing impact tends to be significant when the glass ribbon runs down straight down from the edge of the lip face. Accordingly the glass ribbon is likely to be deformed by landing, and this deformation by landing may have bad influence over the smoothness of the flat glass.

The present invention has been made under these circumstances, and it is an object of the present invention to provide a process for producing a flat glass which further improves the smoothness of the flat glass after formed, by improvement in the supply method of a glass ribbon in a molten state to be supplied from a glass melting furnace to a flat glass forming apparatus.

DISCLOSURE OF THE INVENTION

In order to achieve the above object, the present invention provides a process for producing a flat glass, which comprises supplying a glass in a molten state from a glass melting furnace to a flat glass forming apparatus so that it runs down in a ribbon shape, and forming the glass ribbon into a plate shape in the flat glass forming apparatus, characterized in that at least one pair of tension rollers is disposed between the glass melting furnace and the flat glass forming apparatus with a distance along the direction in which the glass ribbon runs down, and the glass ribbon is stretched between the pair of the tension rollers in an S-shape; the tension rollers are formed by a base made of a material capable of containing a liquid therein or formed into a structure capable of containing a liquid therein, and to the tension rollers, a steam film forming agent which is not gaseous at a temperature in the vicinity of room temperature and which is gaseous at least at the glass transition point of the glass or higher, is introduced in a liquid state; and the tension rollers are rotated while applying a surface pressure to the glass ribbon face via a thin layer of a steam film generated by vaporization of the steam film forming agent. Here, stretching the glass ribbon between one pair of tension rollers in an S-shape, includes a case where the glass ribbon is stretched in an inverted S-shape.

According to the present invention, since the glass ribbon is stretched between at least one pair of tension rollers in an S-shape, a surface pressure is applied to the glass ribbon and at the same time, the tension rollers are rotated in such a state that there is a steam film between the glass ribbon and the tension rollers, whereby the face of the glass ribbon can be polished by the tension rollers. Accordingly, even if the traces of transcript of the surface characteristics of the lip face or the traces of pulsation at the edge of the lip face are formed on the glass ribbon, they are erased by polishing by the tension rollers, and thus the smoothness of the glass ribbon to be supplied to the flat glass forming apparatus can be improved. Resultingly, the smoothness of the flat glass after formed by the flat glass forming apparatus can be more improved.

In this case, the effect by polishing is small if the tension rollers rotate at a low rate, and accordingly the rotational circumferential speed of the tension rollers is preferably at least double the falling speed at which the glass ribbon runs down, more preferably at least three times. The tension rollers may be rotated in the same direction as the direction in which the glass ribbon runs down, or they may be rotated in the opposite direction. Here, polishing means that irregularities on the glass face are smoothened by the function of the steam layer formed between the glass ribbon and the tension rollers to make the pressure constant, and does not mean mechanical polishing.

In the embodiment of the present invention, it is preferred that the tension rollers are reciprocated in the glass ribbon width direction. This is because the smoothness of the glass ribbon can be more improved by polishing the glass ribbon both in the tension roller rotation direction and in the glass ribbon width direction, rather than polishing only in the rotation direction. Further, dispersion of the polishing resulting from the surface characteristic distribution of the tension rollers themselves can also be suppressed.

Further, in the embodiment of the present invention, the flat glass forming apparatus is preferably such a flat glass forming apparatus that to supports formed by a base made of a material capable of containing a liquid therein or formed into a structure capable of containing a liquid therein, a steam film forming agent which is not gaseous at a temperature in the vicinity of room temperature and which is gaseous at least at the glass transition point of the glass or higher, is introduced in a liquid state, and the supports and the glass ribbon are made to slide on each other via a thin layer of a steam film generated by vaporization of the steam film forming agent, to form the glass ribbon into a plate shape. By combining the supply method of the glass ribbon from the glass melting furnace to the flat glass forming apparatus in the present invention and the process for forming a flat glass by the steam float process in such a manner, a flat glass more excellent in quality such as the smoothness can be produced.

MODE FOR CARRYING OUT THE INVENTION

Now, the preferred embodiments of the present invention will be explained in detail with reference to the attached drawings.

Figure 1:
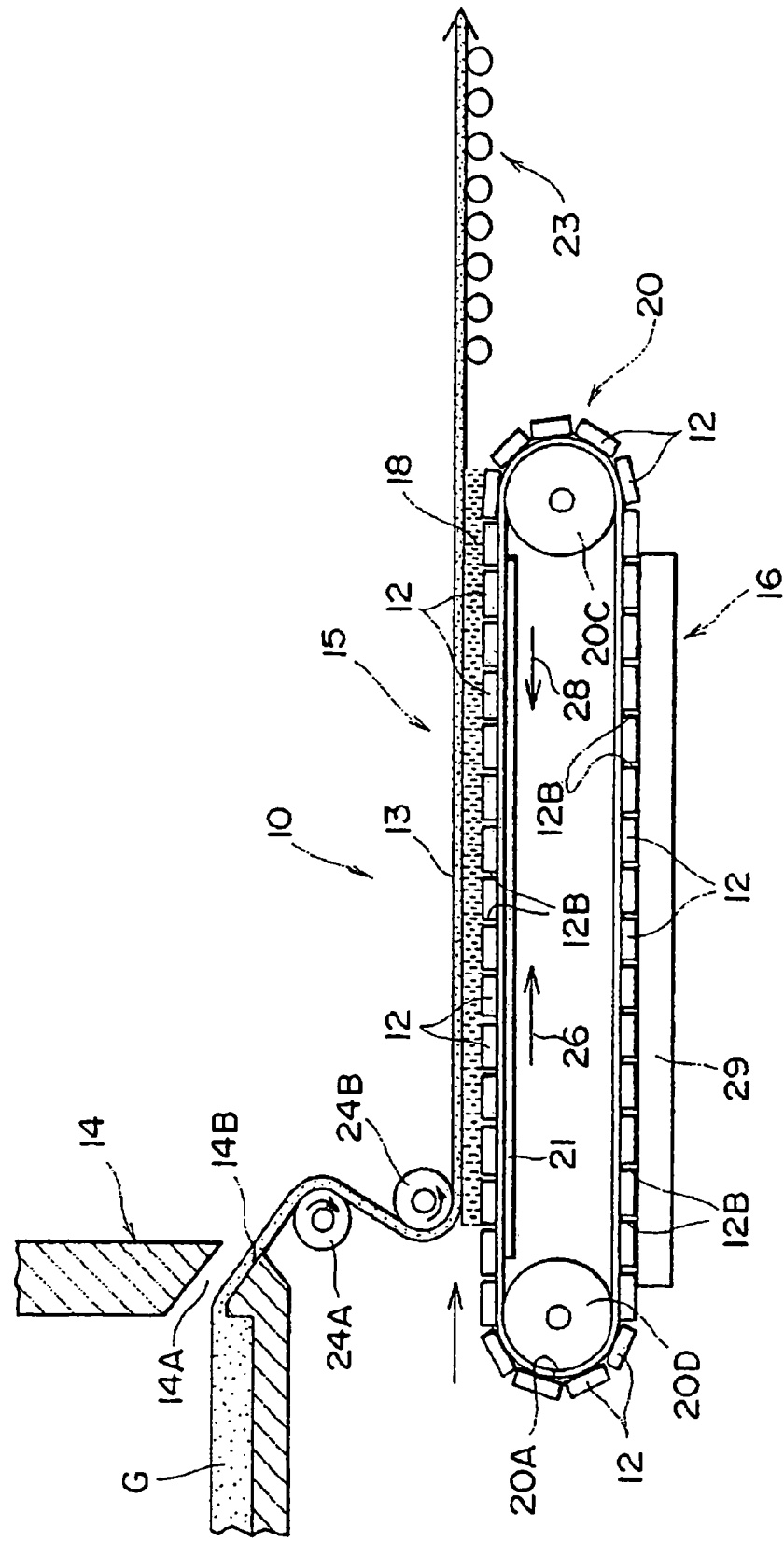
FIG. 1 is a side view schematically illustrating an apparatus for continuously producing a wide flat glass to carry out the present invention.

FIG. 1 is a view schematically illustrating a flat glass continuous production apparatus to carry out the present invention.

A flat glass continuous production apparatus 10 is composed mainly of a glass melting furnace 14, a flat glass forming apparatus 15, and a pair of tension rollers 24A and 24B disposed between the glass melting furnace 14 and the flat glass forming apparatus 15.

The glass melting furnace 14 melts predetermined materials to be a flat glass and at the same time controls the melting temperature to adjust a molten glass G to be in a viscosity range and in a temperature range suitable for forming. To carry out such glass forming, it is important that the temperature of the molten glass G in the initial stages of forming is within a predetermined range, at which the viscosity of the molten glass G is suitable for forming. Namely, preferred is a treatment in a temperature region in which the viscosity of the molten glass G is within a range of from 100 to 1,000,000 poise, preferably from 500 to 100,000 poise, more preferably from 1,000 to 50,000 poise.

The molten glass G the temperature and the viscosity of which are adjusted by the glass melting furnace 14 runs down as a flow of a glass ribbon 13 in a ribbon shape from a lip face 14B made of bricks of an exit slit 14A, and is supplied on supports 12 of the flat glass forming apparatus 15 via a pair of the tension rollers 24A and 24B.

The flat glass forming apparatus 15 is composed of supports 12, 12 . . . formed to be capable of containing a steam film forming agent therein, a supply apparatus 16 which supplies the steam film forming agent to the supports 12, a belt conveyer 20 which makes the supports 12 make a circuit, and carriage driving rollers 23 which carry the formed glass ribbon 13.

The supports 12 may be continuous units or a combination of units in a predetermined length, and units processed into a belt-shape or unit rolls continuously arranged may, for example, be used. In the present embodiment, explanation is made with reference to an example wherein a plurality of rectangular supports 12, 12 . . . are arranged and fixed on the surface of an endless belt 20A of the belt conveyer 20 with a certain distance in a longitudinal direction. When the supports 12 are arranged with a certain distance in such a manner, grooves 12B are formed at right angles to the moving direction of the glass ribbon 13 between the respective supports 12. These grooves 12B are important to let loose the steam of a thin layer 18 of a steam film formed between the supports 12 and the glass ribbon 13, whereby a stable thin layer 18 of a steam film is formed between the glass ribbon 13 and the supports 12.

The endless belt 20A is extended between a pair of rolls consisting of a driving roll 20C and a driven roll 20D, and driven in a clockwise direction or in an anticlockwise direction in FIG. 1. Accordingly, the endless belt 20A can make a circuit in the direction of an arrow 26 or in the direction of an arrow 28 in FIG. 1. Further, the moving speed of the endless belt 20A is set to be different from the speed of progress of the glass ribbon 13 on the supports 12. Accordingly, the supports 12 and the glass ribbon 13 undergo sliding on each other via the thin layer 18 of the steam film. Further, on the belt conveyer 20, a guide plate 21 to guide the upper move path of the endless belt 20A is provided, and the endless belt 20A on the upper side is guided by this guide plate 21 and moves stably.

The supports 12 are formed by a base made of a material capable of containing a liquid therein or formed into a structure capable of containing a liquid therein. Further, the supports 12 are preferably formed by a base made of a material having high affinity with the steam film forming agent or formed into a structure with which the steam film forming agent is easily contained. For example, a porous body or a fibrous body is preferably used. In a case of a porous body, preferred is one having continuous pores. Further, it is important that the supports 12 have such a structure that the amount of generation of the steam of the steam film forming agent is uniform, and basically, the surface of the supports 12 is preferably a flat surface without any shape nor structure. In a case where a steam discharge portion is formed on the supports 12, fine pores which penetrate from the front surface to the back surface of the supports 12 are formed with a constant distance, so that the pores are disposed on the surface of the supports 12 at an even density. The diameter of the pores is preferably at most 6 mm, more preferably at most 3 mm. Further, the distance between the pores is preferably at most 50 mm, more preferably at most 20 mm.

As a material suitable for the supports 12, porous hydrophilic carbon having continuous pores may be suitably used, and another material such as a polymer material derived from a natural product such as cellulose, paper, wood or bamboo, or a carbon type material may, for example, be used. Further, a metal material such as iron, stainless steel, nickel, aluminum, platinum or titanium, a metal oxide such as aluminum oxide, zirconium oxide, silicon carbide or silicon nitride, or a ceramic material containing a metal carbide or a metal nitride as the main component may, for example, be used.

To the supports 12, the steam film forming agent is supplied from the supply apparatus 16, and the steam film forming agent is instantaneously vaporized by the high heat of the glass ribbon 13, to form the thin layer 18 of the steam film between a plurality of the arranged supports 12, 12 . . . and the glass ribbon 13.

As the steam film forming agent, various organic or inorganic materials which are liquid at room temperature and which are gaseous at least at the glass transition temperature or higher may be used. Further, in view of operation properties in supply to the supports 12, preferred is one having a melting point of preferably at most 40° C. and having a boiling point under atmospheric pressure of preferably from 50 to 500° C., more preferably at most 300° C. Further, it is preferred that the steam generated by vaporization of the steam film forming agent is not so chemically reactive as to have bad influences over the glass and the supports 12, has low toxicity and is nonflammable at a temperature at which it is used, and water can be used as a representative example. As mentioned above, it is necessary to properly select as the steam film forming agent a liquid which is instantaneously vaporized by the high heat of the glass ribbon 13 and which can form a stable steam film. The thermal conductivity of the thin layer 18 of the steam film formed by instantaneous vaporization by the high heat is remarkably low as compared with the thermal conductivities of a liquid and a solid, and accordingly a heat insulating environment can be effectively formed for the glass ribbon 13.

The supply apparatus 16 which supplies the steam film forming agent to the support 12 is composed mainly of a bath 29 provided under the belt conveyer 20 and is formed in such a manner that when the endless belt 20A makes a circuit and is under one pair of the rolls 20C and 20D, the supports 12 supported by the endless belt 20A are soaked in the liquid of the steam film forming agent in the bath 29. Accordingly, the steam film forming agent is supplied from the supply apparatus 16 to the supports 12. The supply apparatus 16 is not limited to a bath type apparatus, and it may, for example, be such a type that the steam film forming agent is sprayed on the supports 12, or may be such a type that a liquid in the bath is once contained in a wet roll (not shown) and then the wet roll is brought into contact with the supports 12 to supply the steam film forming agent.

Further, the tension to pull the glass ribbon 13 on the supports 12 in the carriage direction is generated by the resistance between a plurality of the carriage driving rollers 23 and the glass ribbon 13. By making the number of revolutions of the carriage driving rolls 23 variable, the thickness and the quality of the plate glass to be formed are controlled, and at the same time, e.g. the period during which the glass ribbon 13 is in contact with the thin layer 18 of the steam film is changed to control e.g. the cooling time.

Here, in order to stably form a wide flat glass excellent in smoothness by such a flat glass continuous production apparatus 10, if the surface of the glass ribbon 13 before supplied to the flat glass forming apparatus is poor in smoothness, the smoothness of the flat glass after formed may be impaired, and such has to be prevented.

Figure 2:
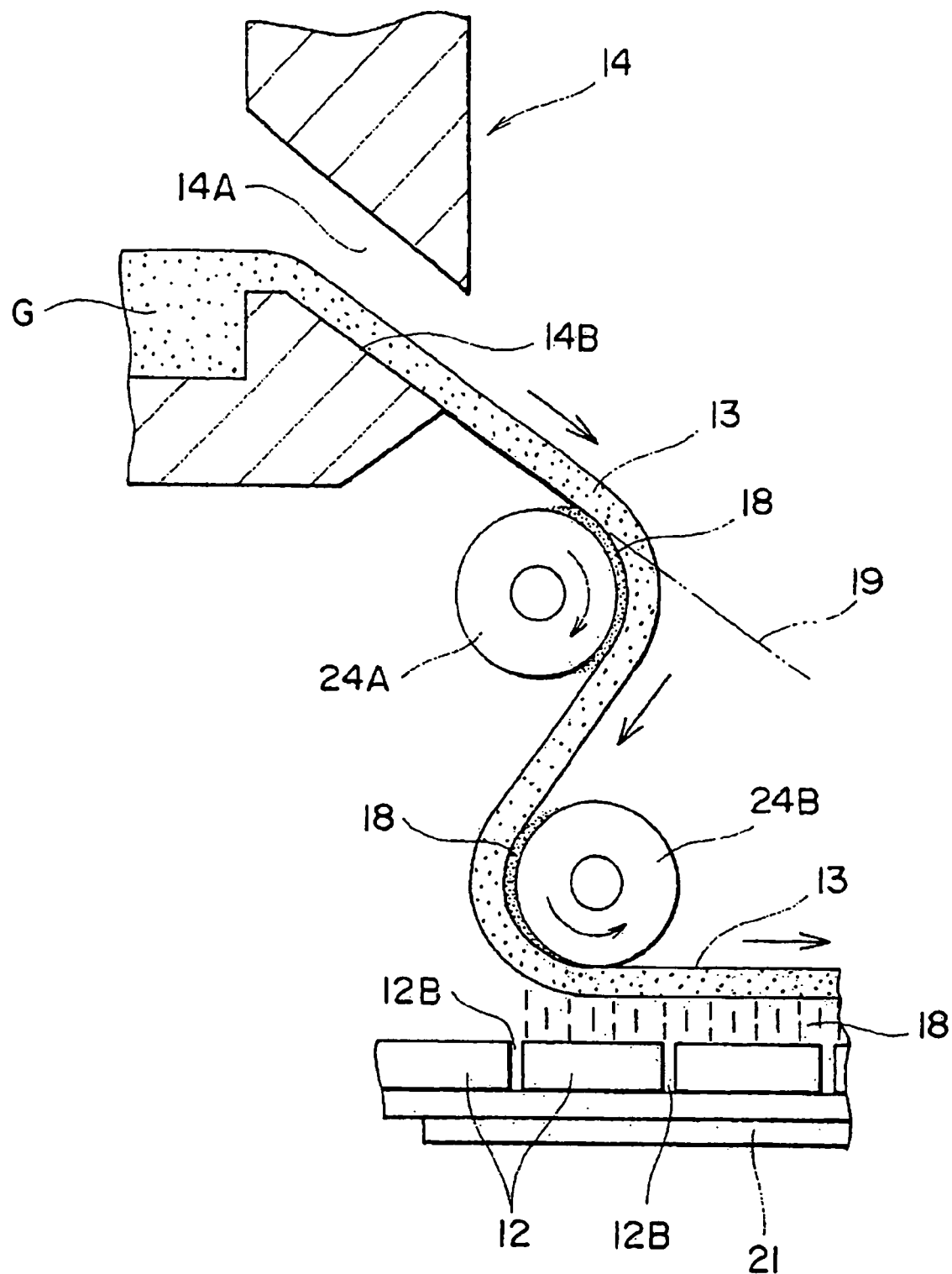
FIG. 2 is an enlarged view illustrating the tension roller portion of an apparatus for continuously producing a wide flat glass to carry out the present invention.
Figure 3:
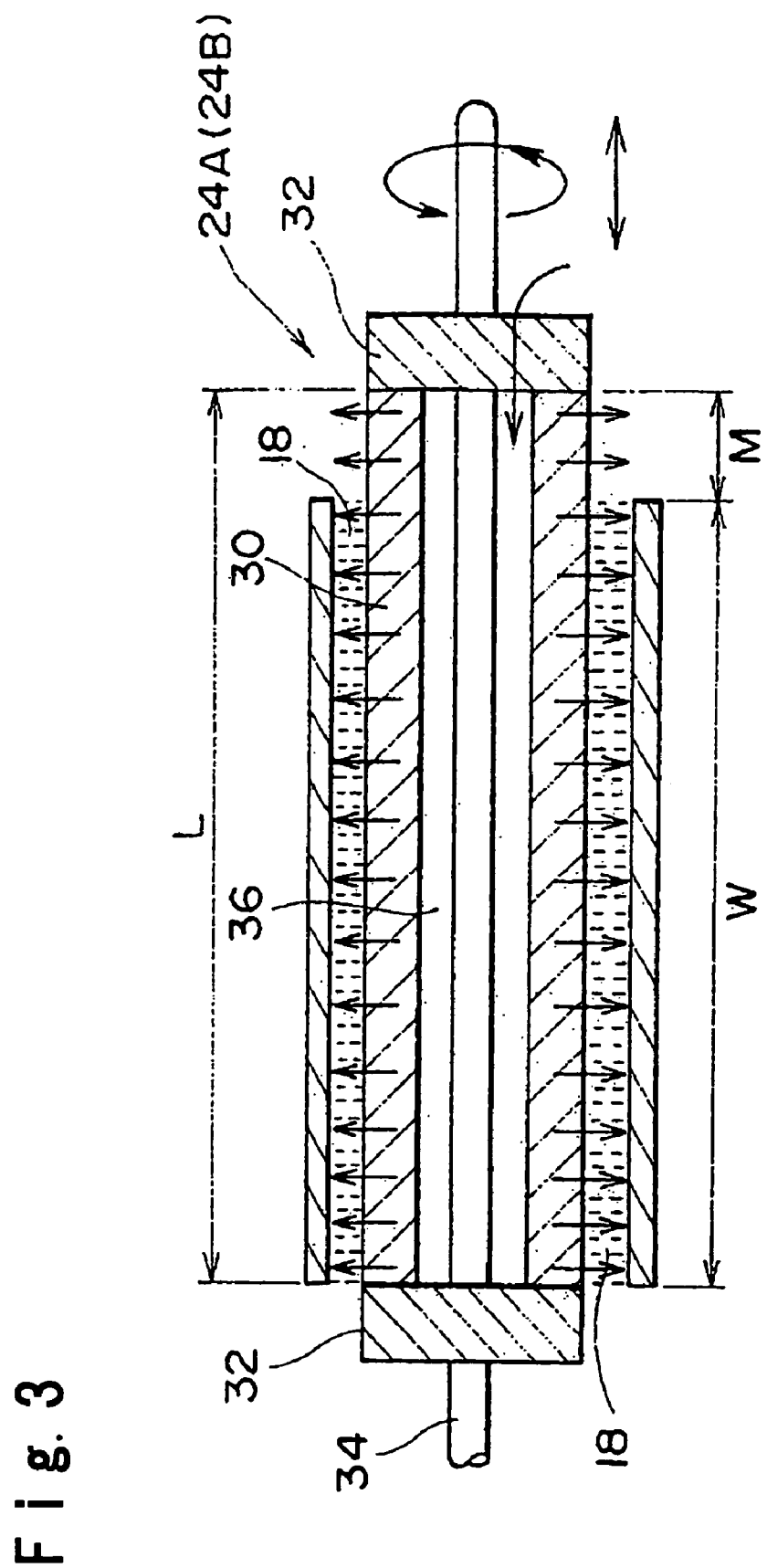
FIG. 3 is a view explaining the structure of a tension roller.

Accordingly, in the flat glass continuous production apparatus 10 of the present invention, as shown in FIGS. 1 to 3, at least one pair of the tension rollers 24A and 24B is disposed with a distance along the direction in which the glass ribbon 13 runs down, between the glass melting furnace 14 and the flat glass forming apparatus 15, and at the same time, the tension rollers 24A and 24B are formed by a base made of a material capable of containing a liquid therein or formed into a structure capable of containing a liquid therein. Further, the glass ribbon 13 is stretched between a pair of the tension rollers 24A and 24B in an S-shape, and at the same time, to the tension rollers 24A and 24B, a steam film forming agent which is not gaseous at a temperature in the vicinity of room temperature (e.g. from 20 to 30° C.) and which is gaseous at least at the glass transition point of the glass or higher, is introduced in a liquid state, so that the tension rollers 24A and 24B are rotated while applying a surface pressure to the glass ribbon face via the thin layer 18 of the steam film generated by vaporization of the steam film forming agent. Here, stretching the glass ribbon 13 between a pair of the tension rollers 24A and 24B in an S-shape includes a case of an inverted S-shape, and FIGS. 1 and 2 illustrate a case of an inverted S-shape. Whether the S-shape or the inverted S-shape is determined by the positions of the glass melting furnace 14 and the flat glass forming apparatus 15. The number of the tension rollers 24A and 24B is not limited to one pair. However, if the number is too high, the glass ribbon 13 is cooled too much until it is supplied to the flat glass forming apparatus 15, and thus formation of a flat glass becomes difficult. Accordingly, preferred is one pair of (two) tension rollers 24A and 24B, as shown in FIG. 1.

Further, the upper tension roller 24A which is close to the glass melting furnace 14 is disposed preferably in the vicinity of the lip face 14B and in such a manner that the roll face of the tension roller 24A is substantially in contact with an extension 19 (see FIG. 2) extended from the edge of the lip face 14B. Accordingly, the direction of the glass melting furnace which runs down from the glass melting furnace 14 is guided in a constant direction by the upper tension roller 24A, whereby the angle at which the glass ribbon 13 runs down from the edge of the lip face 14B can be made constant without being influenced by the viscosity of the glass ribbon 13. Accordingly, the glass ribbon 13 will not pulsate at the edge of the lip face 14B. Accordingly, the traces of the pulsation on the glass ribbon 13 can be prevented and at the same time, the angle at which the glass ribbon 13 runs down can be made constant, whereby supply of the glass ribbon 13 from the glass melting furnace 14 to the flat glass forming apparatus 15 can be stabilized.

On the other hand, the lower tension roller 24B which is close to the flat glass forming apparatus 15 is disposed preferably in the vicinity of the supports 12 on the flat glass forming apparatus 15. Accordingly, the glass ribbon 13 which runs down from the glass melting furnace 14 via the upper tension roller 24A is led along the roller face of the lower tension roller 24B, and thus it curves around the roller face and lands on the supports 12. Accordingly, the glass ribbon 13 will not land at right angles to the supports 12 as in a conventional case but gently lands on the supports 12. Accordingly, the impact generated at the time of landing of the glass ribbon 13 can be decreased, and deformation of the glass ribbon 13 by landing can be prevented, and thus the smoothness of the flat glass after formed will improve.

The tension rollers 24A and 24B are composed, as shown in FIG. 3, in such a manner that the side surface portion 30 of the roll body is formed by a roll base capable of containing the steam film forming agent therein and at the same time, each edge 32 of the roll is formed by a base in which no steam film forming agent is contained, so that the steam film forming agent introduced to the roll base is vaporized from the roll surface. Further, the tension rollers 24A and 24B are rotated at a high speed by a motor which is not shown. Further, they may be reciprocated in the width direction of the glass ribbon 13 by a reciprocating apparatus which is not shown. By the reciprocating apparatus, the tension rollers 24A and 24B reciprocate in the width direction of the glass ribbon 13 while rotating at a high speed, in such a state that the thin layer 18 of the steam film is stably formed between the glass ribbon 13 and each of the tension rollers 24A and 24B. In this case, the effect of polishing tends to be small if the tension rollers 24A and 24B rotate at a low speed, and accordingly the rotational circumferential speed of the tension rollers 24A and 24B is preferably at least double the falling speed at which the glass ribbon 13 runs down, more preferably at least three times. The tension rollers 24A and 24B may be rotated in the same direction as the direction in which the glass ribbon runs down, or may be rotated in the opposite direction. Further, as the length (L) of the side surface portion 30 of the tension rollers 24A and 24B, a length of at least the sum of the width dimension (W) of the glass ribbon 13 and the distance (M) of reciprocation has to be secured.

As a method to supply the steam film forming agent to the tension rollers 24A and 24B, it may be supplied to a central cavity 36 formed between a rotating shaft 34 and the side surface portion 30 of the tension rollers 24A and 24B, so that the entire roll base is soaked in the steam film forming agent, or a wet roll (not shown) may be disposed to be in contact with the side of the tension rollers 24A and 24B which does not face the glass ribbon 13, so that the steam film forming agent supplied to the wet roll is transferred to the tension rollers 24A and 24B. Otherwise, a spray method wherein the steam film forming agent is sprayed on the surface of the tension rollers 24A and 24B by using a nozzle may also be employed. The point is that the method is a supply method by which the steam film forming agent is adequately contained in the roll base of the tension rollers 24A and 24B.

The tension rollers 24A and 24B are formed by a base made of a material capable of containing a liquid therein or formed into a structure capable of containing a liquid therein, and for example, a porous body or fibrous body material may be suitably used. In a case of a porous body, preferred is one having continuous pores. Further, the surface of the porous body has fine pores having a pore diameter of preferably at most 5 mm, more preferably at most 1 mm, furthermore preferably at most 100 μm. Further, preferred is a material having high affinity with the steam film forming agent.

As a suitable material of the tension rollers 24A and 24B, porous hydrophilic carbon is particularly suitable in the same manner as the above supports 12, and another material such as a polymer material derived from a natural product such as cellulose, paper, wood or bamboo, a synthetic polymer material such as a thermoplastic resin, a thermosetting resin or a rubber, or a carbon type material may be suitably used. Further, a metal material such as iron, stainless steel or platinum, a metal oxide such as aluminum oxide, zirconium oxide, silicon carbide or silicon nitride, or a ceramic material containing a metal carbide or a metal nitride as the main component, may, for example, be used. The steam film forming agent to be used is similar to the steam film forming agent to be supplied to the supports 12.

Now, a process for forming a flat glass by using the flat glass continuous production apparatus 10 composed as mentioned above will be explained below. Explanation will be made with reference to an example wherein water is used as the steam film forming agent.

From a glass melting furnace 14, a molten glass G as a glass ribbon 13 in a ribbon shape is supplied from a lip face 14B via a pair of tension rollers 24A and 24B on supports 12 of a flat glass forming apparatus 15. Water maintained in the tension rollers 24A and 24B is instantaneously vaporized by the high heat of the glass ribbon 13 when the glass ribbon 13 runs down via one pair of the tension rollers 24A and 24B. Accordingly, water vapor is continuously generated at the interface between the glass ribbon 13 and the tension rollers 24A and 24B, and a thin layer 18 of a steam film is formed between the glass ribbon 13 and the tension rollers. Further, since the glass ribbon 13 is stretched between a pair of the tension rollers 24A and 24B in an inverted S-shape, a surface pressure is imparted by means of the thin layer 18 of the steam film. In such a state, the tension rollers 24A and 24B rotate at a high speed and at the same time they reciprocate in the width direction of the glass ribbon 13. Accordingly, the back surface (the face which is in contact with the lip face) of the glass ribbon 13 in a molten state is polished by the upper tension roller 24A via the thin layer 18 of the steam film. Then, the front surface of the glass ribbon 13 is polished by the lower tension roller 24B via the thin layer 18 of the steam film. Accordingly, even when the traces of transcription of the surface characteristics of the lip face 14B or the traces of the pulsation at the edge of the lip face 14B are formed on the glass ribbon 13, they can be erased by polishing by means of the tension rollers 24A and 24B.

Resultingly, the smoothness of the glass ribbon 13 before supplied to the glass forming apparatus 15 can be improved, and thus the smoothness of the flat glass formed by the flat glass forming apparatus 15 can be further improved. In this polishing, the tension rollers 24A and 24B may be merely rotated at a high speed, however, polishing in the rotation direction and polishing in the width direction of the glass ribbon 13 may be combined, whereby the smoothness of the glass ribbon 13 can be further improved.

Then, the glass ribbon 13 polished by a pair of the tension rollers 24A and 24B is supplied so that it gradually lands on the supports 12 of the flat glass forming apparatus 15 by the lower tension roller 24B. With respect to the landing of the glass ribbon 13 on the supports 12, by the circling movement of a belt conveyer 20, grooves 12B to let loose the steam between the respective supports 12 and the landing point of the glass ribbon 13 periodically agree with each other.

However, due to the gradual landing by the lower tension roller 24B, formation of the traces of grooves due to the glass ribbon 13 falling down into the grooves 12B can be prevented.

When the high temperature glass ribbon 13 is continuously supplied on the supports 12, water maintained in the supports 12 is instantaneously vaporized by the high heat of the glass ribbon 13. Accordingly, water vapor is continuously generated at the interface between the glass ribbon 13 and the supports 12, whereby a thin layer 18 of a steam film is formed between the glass ribbon 13 and the supports 12. In such a case, a molten glass G supplied from the glass melting furnace 14, in a case of an ordinary soda lime glass, is supplied on the supports 12 usually at a temperature of from about 900 to about 1,200° C. which is suitable for forming. However, if the temperature is too high, generation of the steam from the supports 12 tends to be too intense, whereby stable supply operation will be inhibited and at the same time, durability of various components as represented by the supports 12 and the apparatus will be impaired. Accordingly, depending on the composition of the glass, it is preferred that the glass ribbon 13 is made to run down on the supports 12 usually at a temperature not higher than 1,400° C.

As mentioned above, the temperature of the glass ribbon 13 which runs down from the glass melting furnace 14 to the supports 12 is preferably lower, however, if the temperature of the glass ribbon 13 which runs down is low, the upstream portion, particularly the falling portion, of the glass ribbon 13 is likely to float up from the supports 12, due to the pull strength by a carriage driving rollers 23 which carry the glass ribbon 13. In such a case also, in the present invention, since the lower tension roller 24B is disposed in the vicinity of the supports 12, floating of the glass ribbon 13 from the supports 12 can be prevented. Accordingly, the shape of the glass ribbon will hardly be unstable, and the glass ribbon 13 will not windingly be carried. As mentioned above, the lower tension roller 24B has two functions of polishing of the glass ribbon 13 and preventing the glass ribbon 13 from floating up.

In the present embodiment, explanation has been made with reference to a case where the flat glass forming apparatus 15 employs "steam float process". However, the flat glass forming apparatus 15 is not limited to "steam float process", and a combination of the tension rollers 24A and 24B and a fusion process, or a combination of the tension rollers 24A and 24B and another flat glass forming apparatus, may, for example, be employed. Further, the float glass forming apparatus 15 has been explained with reference to a transfer type wherein the supports 12 make a circuit by means of the belt conveyer 20, however, the apparatus may be of a fixed bed type wherein the supports 12 do not move but are fixed.

INDUSTRIAL APPLICABILITY

According to the present invention, a method of supplying a glass ribbon in a molten state to be supplied from a glass melting furnace to a flat glass forming apparatus is improved by disposing at least one pair of tension rollers between the glass melting furnace and the flat glass forming apparatus, whereby the smoothness of a flat glass after formed can be further improved.

The entire disclosure of Japanese Patent Application No. 2002-182606 filed on Jun. 24, 2002 including specification, claims, drawings and summary is incorporated herein by reference in its entirety.

What is claimed is:

1. A process for producing a flat glass, comprising:
providing a glass melting furnace, a flat glass forming apparatus and at least one pair of tension rollers positioned between the glass melting furnace and the flat glass forming apparatus, the at least one pair of tension rollers including a roll base configured to contain a liquid therein;
melting a glass in the glass melting furnace to form a molten glass;
forming a glass ribbon by discharging the molten glass from the glass melting furnace to the tension rollers in a ribbon shape;
introducing a steam film forming agent to the tension rollers in a liquid state, the steam film forming agent comprising a material being not gaseous at a temperature in the vicinity of room temperature and gaseous at a glass transition point of the glass or a temperature higher than the glass transition point;
vaporizing the steam film forming agent to form a thin layer of a steam film on a surface of the tension rollers;
stretching the glass ribbon by the tension rollers in an S-shape;
rotating the tension rollers while applying a pressure to a face of the glass ribbon via the thin layer of the steam film such that the tension rollers polish the face of the glass ribbon; and
forming the glass ribbon into a plate shape in the flat glass forming apparatus.

2. The process for producing a flat glass according to claim 1, the rotating includes rotating the tension rollers while reciprocating the tension rollers in a width direction of the glass ribbon.

3. The process for producing a flat glass according to claim 1, the forming includes:
introducing a steam film forming agent to supports provided on a surface of the flat glass forming apparatus in a liquid state, the support including a base comprising a material capable of containing a liquid therein or having a structure capable of containing a liquid therein, the steam film forming agent comprising a material being not gaseous at a temperature in the vicinity of room temperature and gaseous at a glass transition point of the glass or at a temperature higher than the glass transition point;
vaporizing the steam film forming agent to form a thin layer of a steam film; and
sliding the supports and the glass ribbon against each other via the thin layer of the steam film.

4. The process for producing a flat glass according to claim 1, wherein the glass ribbon is carried in the flat glass forming apparatus at a speed, and the tension rollers are rotated at a rotational circumferential speed at least double the speed of the glass ribbon being carried between the tension rollers.

5. The process for producing a flat glass according to claim 4, wherein the glass ribbon is pulled by carriage driving rolls provided in the flat glass forming apparatus.

6. The process for producing a flat glass according to claim 2, wherein the tension rollers are reciprocated within a distance (M) while satisfying the following:

$$(L) \geq (W) + (M),$$

where (L) is a length of the tension rollers and (W) is a width of the glass ribbon passing between the tension rollers.

7. The process for producing a flat glass according to claim 1, wherein the at least one pair of tension rollers include a rotating shaft, a side surface portion and a central cavity, and the steam film forming agent is supplied to the central cavity.

8. The process for producing a flat glass according to claim 1, wherein the roll base comprises a porous body having pores having a pore diameter of 5 mm or less.

9. The process for producing a flat glass according to claim 1, wherein the roll base comprises a porous hydrophilic carbon.

10. The process for producing a flat glass according to claim 3, wherein the glass ribbon is supplied on the supports at a temperature from about 900 to about 1,200° C.

* * * * *